(12) United States Patent
Kinoshita

(10) Patent No.: US 7,352,485 B2
(45) Date of Patent: Apr. 1, 2008

(54) PRINTING METHOD, STORAGE MEDIUM AND PROGRAM FOR PERFORMING A PRINTING OPERATION AND A PRINTING DEVICE

(75) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 758 days.

(21) Appl. No.: 10/229,143

(22) Filed: Aug. 28, 2002

(65) Prior Publication Data

US 2003/0053122 A1      Mar. 20, 2003

(30) Foreign Application Priority Data

Aug. 29, 2001   (JP)   ............... 2001-259026

(51) Int. Cl.
*G06F 3/12* (2006.01)
*G06K 15/00* (2006.01)

(52) U.S. Cl. .................. 358/1.15; 358/1.16; 358/1.13

(58) Field of Classification Search .............. 710/33, 710/38; 455/422, 422.1; 709/217, 219, 709/203, 214–215, 216; 370/389; 358/1.15, 358/1.16, 1.14, 1.13, 1.17, 1.6, 1.18, 402, 358/407, 468, 404, 444, 1.1

See application file for complete search history.

(56) References Cited

U.S. PATENT DOCUMENTS

| | | | | |
|---|---|---|---|---|
| 5,353,359 A | | 10/1994 | Urabe et al. | |
| 5,862,321 A | * | 1/1999 | Lamming et al. | 709/200 |
| 5,956,487 A | * | 9/1999 | Venkatraman et al. | 709/218 |
| 6,144,997 A | * | 11/2000 | Lamming et al. | 709/217 |
| 6,452,692 B1 | * | 9/2002 | Yacoub | 358/1.15 |
| 6,515,988 B1 | * | 2/2003 | Eldridge et al. | 370/389 |
| 6,625,447 B1 | * | 9/2003 | Rossmann | 455/426.1 |
| 6,801,962 B2 | * | 10/2004 | Taniguchi et al. | 710/33 |
| 2002/0051178 A1 | * | 5/2002 | Nakayasu et al. | 358/1.15 |
| 2003/0009498 A1 | * | 1/2003 | Koegler | 707/517 |

FOREIGN PATENT DOCUMENTS

| | | |
|---|---|---|
| EP | 0 886 206 | 12/1998 |
| WO | WO00/41064 | * 7/2000 |

* cited by examiner

*Primary Examiner*—Dov Popovici
(74) *Attorney, Agent, or Firm*—Oblon, Spivak, McClelland, Maier & Neustadt, P.C.

(57) ABSTRACT

A printing method for printing an electronic file using a printing device is disclosed. The printing device is connected via a network to a user terminal and to a file server in which electronic files accompanied by respective identifiers are stored. The method includes the steps of enabling the printing device to receive a print request from the user terminal via the network, the print request containing the identifier of the electronic file, to retrieve the electronic file from the file server via the network using the identifier of the electronic file and to print the retrieved electronic file.

21 Claims, 5 Drawing Sheets

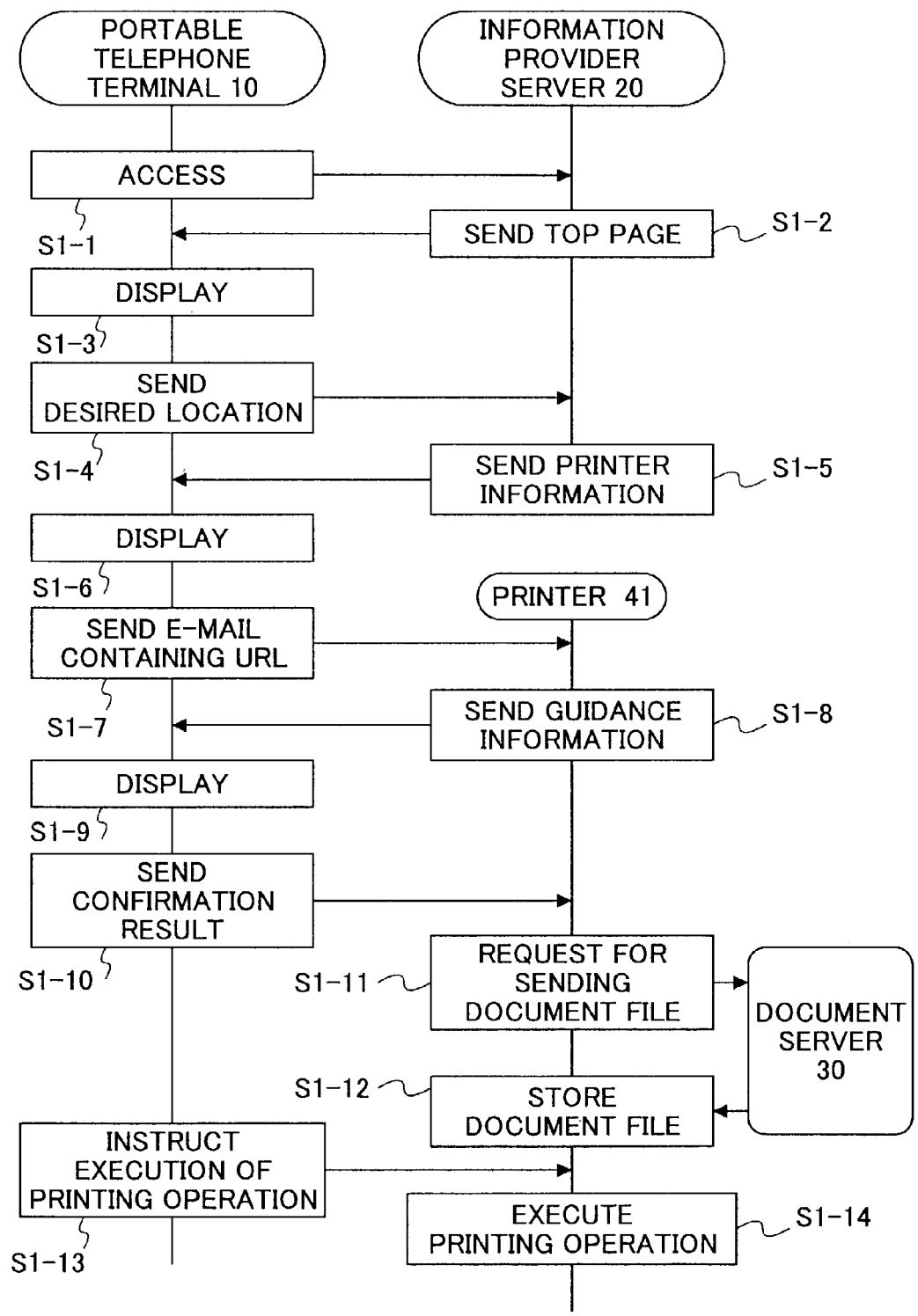

FIG.6A

E-MAIL TO BE SENT

DESTINATION:

print@xx.com

SUBJECT:

http://www.ABC.co.jp

CONTENT:

RETURN  OK

FIG.6B

RECEIVED E-MAIL

SENDER:

print@xx.com

SUBJECT:

http://www.ABC.co.jp

CONTENT:

WE ARE ADJACENT
ON THE EAST SIDE
OF THE POST
OFFICE.

PRICE IS 20YEN/
SHEET
IF YOU WISH
TO ORDER PRINTS,
PLEASE SEND
BACK THIS E-MAIL.

WHEN EXECUTING A
PRINTING OPERATION,
PLEASE SEND BACK
THIS E-MAIL AGAIN.

RETURN  OK

PRINTING METHOD, STORAGE MEDIUM AND PROGRAM FOR PERFORMING A PRINTING OPERATION AND A PRINTING DEVICE

BACKGROUND OF THE INVENTION

1. Field of the Invention

The present invention generally relates to a printing method, storage medium and program for performing a printing operation and a printing device that are used by a user when printing an electronic file.

2. Description of the Related Art

Recently, there are many occasions where electronic document files and electronic image files are used. An electronic document file is an electronic file in which one or more documents are provided in an electronic form and, in the following text, will be referred to as a "document file". An electronic image file is an electronic file in which one or more images are provided in an electronic form and, in the following text, will be referred to as an "image file". Also, recently, various document files, for example, are provided from various servers via networks such as the Internet. The user can access such documents through computer terminals. When the user wishes to use such documents, electronic document files are downloaded into the user's computer terminal. For printing such documents, the downloaded electronic document files are transmitted as to a printing apparatus, such as a printer, where transmitted electronic document files are processed as printing data. The printer performs printing operations using the printing data.

Thus, the user can obtain a printed document by means of a printer connected to a computer terminal.

However, the user may also wish to obtain a printed document while in an environment where there is no easy access to a printer. Such a case may occur when the user is away from home or from his/her office. There may be a limitation on data storage capacity or screen size for a mobile terminal such as a portable telephone terminal that is usually carried by the user when he/she is away from home or from office. In such a case, it is difficult to have free access to a desired document Also, such a mobile terminal may require a considerable period of time for creating printing data or for transmitting data to the printer.

SUMMARY OF THE INVENTION

Accordingly, it is a general object of the present invention to provide a printing method that can obviate the problems described above.

It is another and more specific object of the present invention to provide a printing method, a storage medium and a program for performing a printing operation and a printing device with which printing operations can be efficiently performed by the user.

In order to achieve the above objects, a printing method is provided for printing an electronic file using a printing device connected via a network to a user terminal requesting a printing operation and to a file server in which electronic files accompanied by respective identifiers are stored. The method includes the steps of:

a) enabling said printing device to receive a print request from said user terminal via said network, said print request containing said identifier of the electronic file;

b) enabling said printing device to retrieve said electronic file from said file server via said network using said identifier of said electronic file; and c) enabling said printing device to print said retrieved electronic file.

A machine readable medium, a printing device and a program are also provided for printing an electronic file using a printing device connected via a network to a user terminal requesting a printing operation and to a file server in which electronic files accompanied by respective identifiers are stored, wherein the printing device receives a print request from said user terminal via said network, said print request containing said identifier of the electronic file; retrieves said electronic file from said file server via said network using said identifier of said electronic file; and prints said retrieved electronic file.

With the above method, a machine readable medium, a printing device and a program, the desired electronic file can be printed by sending a print request containing the identifier of the electronic file from the user terminal. Therefore, since there is no need to download the electronic file itself to the user terminal, prints (printed documents) can be supplied to the users having a terminal with relatively simple functions or a mobile terminal. Further, since an email address is assigned to the printing device, the print request can be made using an e-mail message sent to the e-mail address of the printing device. Therefore, a printing operation can be performed even if the user terminal is not provided with special purpose driver software. Further, since the identifier of the electronic file indicates the location where the electronic file is stored, the electronic file made open to the public on the network can be printed in a simple and efficient manner. Further, since the network includes the Internet wherein various electronic files are made open to the public, various information items can be obtained in a simple and efficient manner. Further, since the printing operation is executed in accordance with the print execution instruction from the user, prints can be positively supplied to the user. This is particularly advantageous in a case where the user terminal and the printing device are provided at remote locations.

BRIEF DESCRIPTION OF THE DRAWINGS

FIG. 4 is a flowchart showing a process of the embodiment of the present invention.

FIGS. 6A and 6B are diagrams showing display screens displayed on a display part of a portable telephone terminal as described in FIG. 4.

DETAILED DESCRIPTION OF THE PREFERRED EMBODIMENTS

In the following, principles and embodiments of the present invention will be described with reference to the accompanying drawings.

An embodiment of the present invention will be described with reference to FIGS. 1 through 6. The present embodiment will be described as a printing method, a storage medium storing a program for performing a printing operation, a program for performing a printing operation and a printing device that are used for printing electronic document files for which printing instructions have been made by the user via a network. When performing a printing operation, as shown in FIG. 1, a user terminal (portable telephone terminal 10) that is connectable to a network, in this case the Internet I, is used.

In addition to a normal telephone-call capability, the portable telephone terminal 10 has a data-communication capability for send/receive operations of electronic mail (e-mail) and for communications with server devices. The portable telephone terminal 10 stores various programs for performing various functions such as a data send/receive function and a data display function. When these programs are executed, functions for communication means and display means can be achieved. To this end, the portable telephone terminal 10 is provided with means such as control means (CPU) and storage means (e.g., RAM, ROM) all of which are not shown in the figures.

Figure 1:
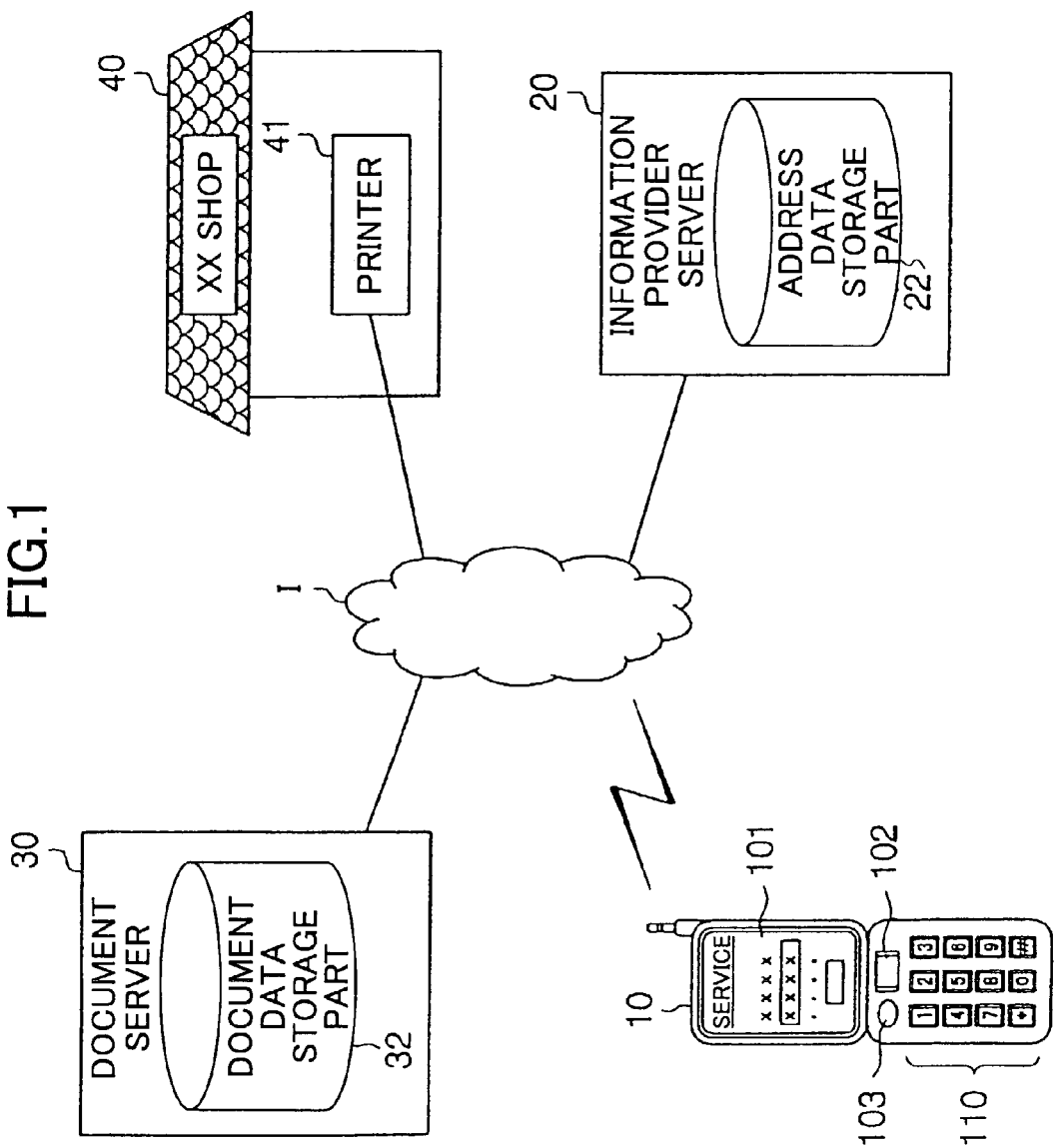
FIG. 1 is a diagram showing a configuration of a system of an embodiment of the present invention.

Further, as shown in FIG. 1, the portable telephone terminal 10 is provided with dial number buttons 110, a display part 101, a selection button 102 and a mode-switching button 103. When the mode of operation is to be switched from a normal telephone mode to a data communication mode, the mode-switching button 103 is pressed. On the display part 101, data received by the portable telephone terminal 10 and a pointer are displayed. The selection button 102 has a direction-indicating function (pointer-moving function) and a click function. The pointer can be moved by performing the direction-indicating function by means of the selection button 102 and an item pointed to by the pointer can be selected by pressing (or clicking) the selection button 102.

As shown in FIG. 1, the Internet I serves as a network for connecting an information-provider server device 20, a document server device 30 serving as a file server and a printer 41 serving as a printing device installed at a shop 40.

In the present embodiment, a document desired by the user is printed by means of the printer 41. The printer 41 is a printing means whereto an electronic mail address (e-mail address) is assigned. For example, an e-mail address "print@XX.com" is assigned to the printer 41 installed at a convenience store "Convenience Store XX".

The printer 41 is provided with means such as control means (CPU), storage means (e.g., RAM, ROM, hard disk) and display means, all of which are not shown in the figures. The printer 41 stores various programs for performing various functions such as a data-printing function, a data send/receive function and other functions described later, which when these programs are executed, function as various means (print request receiving means, electronic file retrieving means and electronic file printing means).

Figure 2:
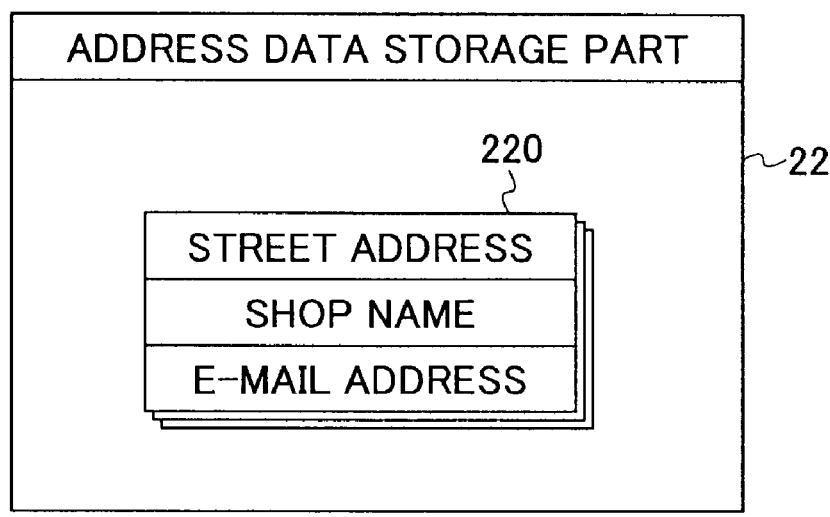
FIG. 2 is a diagram showing data stored in an address data storage part shown in FIG. 1.

The information provider server device 20 is a computer system for providing a service for giving guidance to the user about locations where the printers are installed. The information provider server device has a street (postal mailing) address data storage part 22. As shown in FIG. 2, the street address data storage part 22 stores address data 220 related to printer information provided by the user. The address data 220 is stored when a printer having an e-mail address is installed at a predetermined location and becomes capable of providing a printing service.

In the present embodiment, the street address data storage part 22 contains data related to street address, shop name and e-mail address in such a manner that the data are mutually linked with each other. In the street address data area, data related to street address are stored as data for specifying the location where the printer is installed. In the shop name data area, data related to shop name are stored as data for specifying a service provider where the printer is installed. In the e-mail address data area, data related to the e-mail address assigned to the printer are stored.

Figure 3:
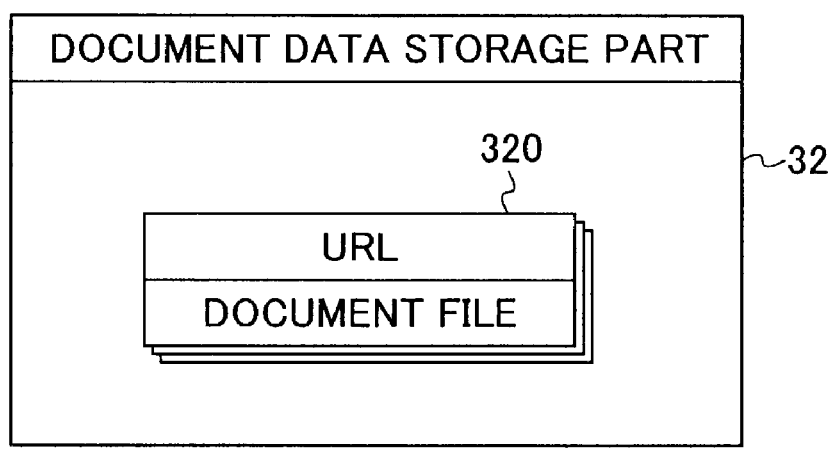
FIG. 3 is a diagram showing data stored in a document data storage part shown in FIG. 1.

The document server device 30 is embodied as a computer system for providing document files in the form of electronic files. The document server device 30 has a document data storage part 32. As shown in FIG. 3, document data 320 related to documents offered by the user are stored in the document data storage part 32.

The document data 320 are stored when the document to be displayed or printed is input. For example, when the user wishes to print the document while he/she is away from home or office, the document is input in advance with a predetermined document identifier. In the present embodiment, in order to identify the documents, URLs (Uniform Resource Locators) serving as identifiers of document files and data related to document files in an electronic form are stored in the document data storage part 32 in a mutually associated manner. For example, the document file to be printed is stored such that it is associated with a URL "http://www.ABC.co.jp".

Referring now to FIG. 4, a description will be provided of process steps that are executed when the user wishes to print a desired document using the system of the present invention described above. The process steps may be divided into steps whereby the user requests a printing operation and steps for executing the printing operation.

First, the steps whereby the user requests a printing operation will be described with reference to FIG. 4. The user accesses the information provider server device 20 via the portable telephone terminal 10 (S1-1). In this case, access is made via the Internet.

Figure 5A:
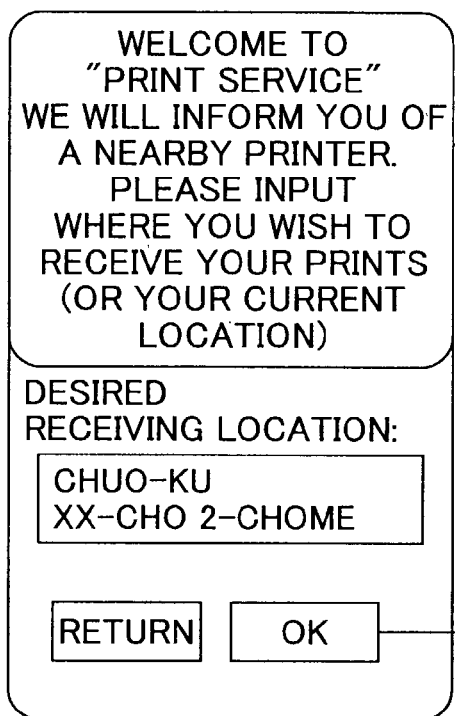
FIGS. 5A and 5B are diagrams showing display screens displayed on a display part of a portable telephone terminal as described in FIG. 4.

When there is access, the information provider server device 20 sends data related to the top-page to the portable telephone terminal 10 (S1-2). The portable telephone terminal 10 is provided with a display part 101. Upon reception of the data, a display screen 500 shown in FIG. 5A is output on the display part 101 (S1-3). The display screen 500 includes a desired destination input field for inputting a postal mailing address (street address) whereat the printed matter is to be received by the user. In the present embodiment, the user's current address is "CHUO-KU XX-MACHI 2-CHOME", assuming that the user wishes to receive the printed matter at the nearest shop. Accordingly, the user inputs "CHUO-KU XX-MACHI 2-CHOME" into the desired destination input field of the display screen 500.

Then the user moves the pointer displayed on the display part 101 using the selection button 102 to select "OK". In this case, the portable telephone terminal 10 sends to the information provider server device 20 the data input into the desired destination input field (S1-4). The information provider server device 20, which has received the data, uses the received destination information to search for a printer that is installed at the location nearest to the desired destination from the address data 220 stored in the address data storage part 22. Then, the information provider server device 20 sends printer information to the portable telephone terminal 10 (S1-5). The printer information includes data associated with the street address of the shop where the printer is installed, the name of the shop and the e-mail address.

Figure 5B:
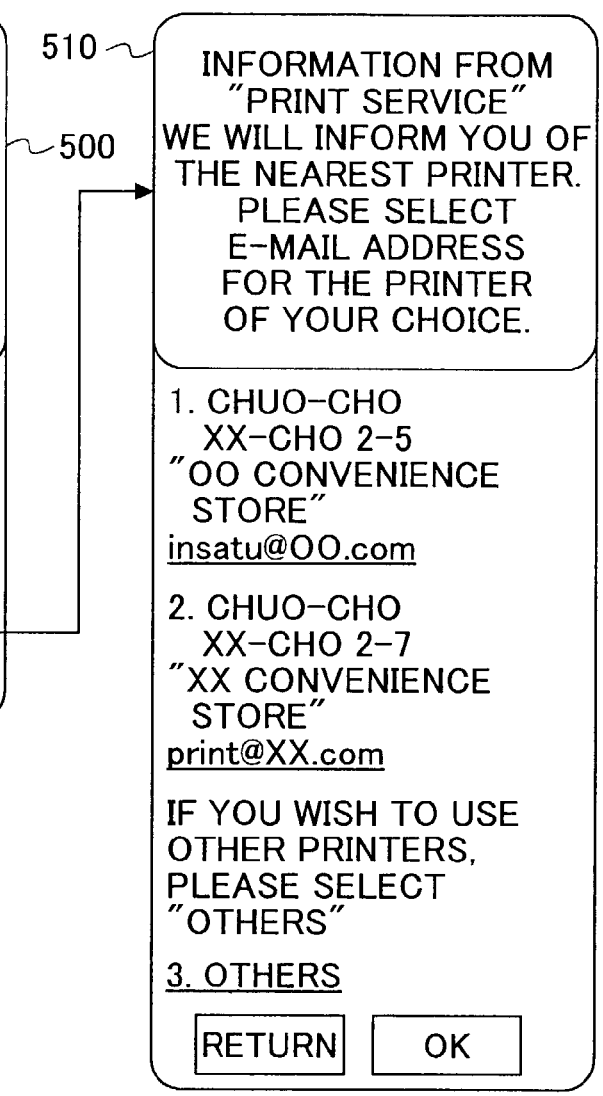

A display screen 510 shown in FIG. 5B is output on the display part 101 of the portable telephone terminal 10 that has received the printer information (S1-6). The display screen 510 contains information associated with the street address of the shop 40, the shop name and the e-mail address that are extracted by the information provider server device 20.

Then, the user operates the selection button 102 to move the pointer displayed on the display part 101 and selects the e-mail address of the printer to be used for printing. In the present embodiment, it is assumed that the printer 41 installed at "Convenience Store XX" (shop 40) is used, and therefore "print@XX.com" is selected. In this case, a display screen 520 shown in FIG. 6A is output on the display part 101 of the portable telephone terminal 10. The display screen 520 is a screen used for sending e-mail and contains an address field 521, a subject field 522 and a content field 523. The e-mail address of the printer selected by the user is preset in the address field 521.

Then, the user inputs into the subject field 522 a URL where the desired document is kept. In the present embodiment, it is assumed that the document file desired by the user is recorded at "http://www.ABC.co.jp" and that this URL is input into the subject field 522. Then, the user operates the selection button 102 to move the pointer displayed on the display part 101.

Thus, the portable telephone terminal 10 sends an e-mail to the e-mail address (in this case, "print@XX.com") (S1-7). This e-mail contains the URL of the document and the e-mail address (in this case, the e-mail address of the portable telephone terminal 10) of the sender. The printer 41 which has received this e-mail sends back guidance information to the portable telephone terminal 10 (S1-8).

A display screen 530 shown in FIG. 6B is output on the display part 101 of the portable telephone terminal 10 which has received the guidance information (S1-9). The display screen 530 contains guidance information such as the location of the shop 40 where the printer 41 is installed (in this case, "adjacent on the east side of the post office") and guidance information about printing price (in this case, "20 yen per sheet").

The user who has checked the guidance information sends a check result to the printer 41 (S1-10). The sending operation of the check result is performed by sending back the e-mail received by the portable telephone terminal 10.

After receiving the check result, the printer 41 extracts the URL contained in the subject information and accesses the document server 30 using the URL. In this case, the printer 41 submits a send request to the document server 30 via the Internet I for a document file associated with the URL (S1-11). The document server that has received the send request retrieves the document file from the document data storage part 32 and sends it to the printer 41 via the Internet I. The printer 41 that has received the document file stores the received document file such that the received document file is associated with the e-mail address of the user (S1-12).

Now, a process for executing a printing operation will be described.

The user who has arrived at the shop 40 sends a print execution instruction to the printer 41 using the portable telephone terminal 10 (S1-13). In this case, the user operates the portable telephone terminal 10 such that the display screen 530 shown in FIG. 6b is again displayed on the display part 101 of the portable telephone terminal 10. Then, from the portable telephone terminal 10, a reply for this e-mail is sent again to the printer 41.

The printer 41 that has received the e-mail executes a printing operation for the document file (S1-14). In detail, using the e-mail address of the user who is the sender of the e-mail, the printer 41 retrieves the document file associated with the e-mail address and produces print data to be used in the printing operation. The printer 41 executes the printing operation using the print data. Then, the user pays the printing fee to the shop 40 and receives the printed documents. Thus, the printing operation is completed.

In accordance with the embodiment of the present invention described above, it is possible to achieve advantageous effects described below.

In the embodiment described above, the portable telephone terminal 10 connected to the Internet I is used for ordering prints. Therefore, the prints can be readily obtained even if the portable telephone terminal 10 has a relatively small screen on the display part 101 that is not capable of displaying sufficient information. Also, the user can obtain printed documents even in a case where the user is away from home or from office and has no printer nearby. For example, electronic files such as "lecture material", "presentation material" and "various forms" can be stored as document files in the document data storage part 32, so that the user can obtain printed documents that are required while the user is away from home or from office and has no printer nearby.

In the embodiment described above, an e-mail address is assigned to the printer 41. Therefore, the user can give print requests and print execution instructions to the printer 41 by making direct standard e-mail communications with the printer 41. Since most of the portable telephone terminals 10 are provided with capabilities for sending and receiving e-mail, prints can be provided without introducing special-purpose software (e.g., print driver software) in the portable telephone terminal 10.

In the embodiment described above, when there is a print request from the portable telephone terminal 10, the printer 41 retrieves the document file using the URL and performs a printing operation. Therefore, the user can obtain a printed document by simply providing information related to the URL of the location where the document file can be found. That is to say, since it is not necessary to download the document file to be printed into the portable telephone terminal 10, printed documents can be readily obtained even in a case where the portable telephone terminal 10 of a relatively small storage capacity is used. Also, the amount of data communicated between the portable telephone terminal 10 and the printer 41 can be reduced and thus the user can rapidly make a print request to the printer 41.

In the embodiment described above, the printer 41 that has received the print request retrieves the document file while the user is moving from his current location to the shop 40. Therefore, the user can obtain the document in an efficient manner since the user can save time required for obtaining the document file by using the Internet I.

In the embodiment described above, address data 220 related to printer information to be supplied to the user are stored in the address data storage part 22. In the address data storage part 22, data related to address, shop name and e-mail address are stored in a mutually associated manner. In the address data field, data related to the address are stored as data for specifying the location where the printer is installed. Thus, the printer information related to the printer installed at the area desired by the user can be supplied to the user.

In the embodiment described above, a printing operation is performed after receiving a print execution instruction from the portable telephone terminal 10. Since the printing operation will not be performed when there is no print execution instruction, it is possible to prevent wasting the paper. Also, the print execution instruction can be made at any time convenient for the user (in this case, when the user arrives at the shop 40). Thus, the prints can be supplied to the user at a convenient time.

In the embodiment described above, the print execution instruction is sent in the form of an e-mail from the portable telephone terminal 10 to the printer 41. Using the e-mail address of the user, the document file associated with the e-mail address is retrieved and the printing operation is performed. Thus, the prints can be positively supplied to the user who owns the portable telephone terminal 10.

It is to be noted that the embodiment described above can be altered into the following embodiment.

In the embodiment described above, the printer 41 receives the check result and the e-mail containing the print execution instruction from the portable telephone terminal 10 and then performs a printing operation of the document file. Instead, the document file can be printed together with the e-mail address of the portable telephone terminal 10 at a stage where the e-mail containing the URL is received. In this case, the user who has arrived at the shop 40 obtains the document by giving his e-mail address to the shop assistant. Thus, the time required for the user to wait for the printing operation can be reduced. Accordingly, the check result sending step (S1-10) and the print execution instruction step (S1-13) can be omitted and thus prints can be supplied with reduced traffic on the network.

In the embodiment described above, the document file stored in the document server 30 is printed. The document file may be a web page provided by various sites connected to the Internet I. Thus, even if the user does not have a display with a sufficient capability for displaying the web sites, the web pages can be printed out by the printer 41 and thus the user can readily obtain information on the web sites.

In the embodiment described above, the printer 41 which has received the print execution instruction from the portable telephone terminal 10 performs a printing operation of the document file based on the e-mail address of the user. Instead, in step S1-5, the printer 41 may give a reception number to the user. In this case, the reception number is included in the display screen 530 shown in FIG. 6B. Further, the printer 41 is provided with a reception number input part. The user inputs the reception number to the reception number input part of the printer 41. When the reception number is input, the printer 41 performs a printing operation of the document file. Accordingly, the print execution instruction step (S1-13) may be omitted and thus the printing operation can be readily performed with reduced traffic on the network.

In the embodiment described above, the user pays the fee to the shop 40 and receives the printed document. Instead, the printer 41 may be provided with an input part for reception number and e-mail address and a fee accepting part. In this case, the user inputs into the printer 41 the reception number given by the printer and the e-mail address of the user. Using the reception number and/or the e-mail address, the printer 41 specifies the document file that has been retrieved in advance and has been stored, and displays the fee for the printing operation. When the fee is paid, the printer 41 performs a printing operation of the document file. Thus, the printing service can be offered without intervention of the shop assistant of the shop 40.

In the embodiment described above, a URL for the site where the desired documents are held is input into the subject field 522 displayed on the display screen 520. Instead, the URL may be input in the content field 523. In this case, the printer 41 obtains the URL from the content field of the received e-mail and retrieves the document file.

In the embodiment described above, the display screen 510 includes information associated with the street address, the shop name and the e-mail address of the printer of the shop 40 that are extracted by the information-provider server device 20. Instead or in addition to displaying the address-related information, a map indicating the location of the shop and the installation locations of printers can be displayed. In this case, map information is contained in the address data 220 stored in the address data storage part 22. Thus, the user can ascertain the installation location of the printer 41 with more certainty.

In the embodiment described above, in step S1-4, the URL of the site where the desired document is held is input into the subject field 522 displayed on the display screen 520. In addition, printer settings conditions of the printer can be input in the content field 523 displayed on the display screen 520. In this case, information such as the size of sheet (e.g., "A4"), monochrome printing or color printing (e.g., "color"), number of pages during N-up printing operation in which a plurality of pages are printed on a sheet (e.g., "2-up"), and scaling ratio (e.g., "80%") are input into the content field 523. In this case, the printer 41 extracts the printer settings conditions from the content field 523 of the received e-mail and performs a printing operation based on the print settings condition. Thus, the user can obtain a document printed in the format desired by the user.

In the embodiment described above, the print request is sent to the e-mail address of the printer 41 provided by the information provider server device 20, however, it is possible to use the e-mail address of the printer 41 that is known to the user in advance. In this case, the e-mail address of the printer 41 to be used is input in the address field 521 of the display screen 520 of FIG. 6. Thus, the document can be printed using the printer 41 selected by the user.

In the embodiment described above, a control means (CPU) provided in the printer 41 executes a program for performing functions such as a data send/receive function. Instead, the control means may be provided in other types of devices. For example, the program may be stored in a computer terminal connected to the printer 41 so that the computer terminal can control the printer 41.

In the embodiment described above, the printer 41 is used as a printing means, but it is also possible to use a facsimile terminal or a photocopier connected to the Internet I.

In the embodiment described above, the portable telephone terminal 10 is used as a user terminal. Instead, a personal computer or a PDA (Personal Digital Assistant) may be used.

In the embodiment described above, the portable telephone terminal 10 and the information provider server device 20; the portable telephone terminal 10 and the printer 41; and the document server 30 and the printer 41 are connected via the Internet I, but a local area network (LAN) or a wide area network (WAN) may be used to connect between the above-mentioned elements. For example, using an office LAN, the document file can be printed without downloading the document file to a terminal such as the personal computer terminal of the user.

As has been described above, according to the present invention, a printing operation of a required electronic document file can be performed easily and efficiently via the user terminal.

Further, the present invention is not limited to these embodiments, and variations and modifications may be made without departing from the scope of the present invention.

The present application is based on Japanese priority application No. 2001-259026 filed on Aug. 29, 2001, the entire contents of which are hereby incorporated by reference.

What is claimed is:

1. A printing method for printing an electronic file using printing devices that are coupled via a network to a user terminal which requests a printing operation, to a provider server which stores guidance information that includes e-mail addresses of the printing devices and maps indicating locations of the printing devices, and to a file server which stores electronic files identifiable by corresponding identifiers, said method comprising the steps of:

sending the guidance information that includes the e-mail addresses and the map of at least one location of the printing device from the provider server to the user terminal via the network in response to a request, originated from the user terminal and received via the network, indicating a desired printing location;

receiving, by an arbitrary printing device having the e-mail address specified by the user terminal, via the network, an e-mail originated from the user terminal, said e-mail being a print request containing an identifier of a predetermined electronic file to be printed on the arbitrary printing device;

retrieving the predetermined electronic file from the file server via the network by the arbitrary printing device itself using the identifier of the predetermined electronic file contained in the print request; and printing the predetermined electronic file that is retrieved on the arbitrary printing device in response to a print execution instruction originated from the user terminal and received via the network.

2. The printing method as claimed in claim 1 wherein said identifier of said electronic file is an identifier for indicating a location where said electronic file is stored.

3. The printing method as claimed in claim 1 wherein said network includes the Internet.

4. The printing method as claimed in claim 1, further comprising the step of:

displaying at the user terminal a screen on which the desired location of the arbitrary printing device that is to receive the print request is input.

5. The printing method as claimed in claim 4, further comprising the step of:

searching, by the provider server, the arbitrary printing device approximately matching the desired location based on address data of the printing devices stored in a storage part of the provider server.

6. The printing method as claimed in claim 5, wherein the address data include data related to addresses, shop names and e-mail addresses that are stored in the storage part in a mutually linked manner, and are used to generate the guidance information.

7. The printing method as claimed in claim 4, further comprising the step of:

inputting the e-mail address of the arbitrary printing device on said screen, as the desired location of the arbitrary printing device that is to receive the print request.

8. The printing method as claimed in claim 1, further comprising the step of:

notifying from the arbitrary printing device via the network the user terminal a fee to print the predetermined electronic file that is retrieved on the arbitrary printing device.

9. The printing method as claimed in claim 1, further comprising:

sending guidance information, including information related to the location of the arbitrary printing device and information related to a printing fee, from the arbitrary printing device to the user terminal via the network, in response to the e-mail originated from the user terminal.

10. The printing method as claimed in claim 1, wherein the user terminal is a mobile terminal.

11. The printing method as claimed in claim 1, wherein said retrieving the predetermined electronic file retrieves the predetermined electronic file from the file server before or after receiving the print execution instruction originated from the user terminal.

12. A printing device coupled via a network to a user terminal which requests a printing operation and to a file server which stores electronic files identifiable by corresponding identifiers, said printing device comprising:

a receiving part configured to receive via the network an e-mail having an e-mail address of the printing device and originated from said user terminal, said e-mail being a print request containing an identifier of a predetermined electronic file to be printed on the printing device;

a retrieving part configured to retrieve said predetermined electronic file from said file server itself via said network using said identifier of said predetermined electronic file; and a printing part configured to print said predetermined electronic file in response to a print execution instruction originated from said user terminal and received via said network.

13. The printing device as claimed in claim 12 wherein said identifier of said electronic file is an identifier for indicating a location where said electronic file is stored.

14. The printing device as claimed in claim 12 wherein said network includes the Internet.

15. The printing device as claimed in claim 12, further comprising:

a notifying part configured to notify to the user terminal via the network a fee to print the predetermined electronic file that is retrieved on the printing device.

16. The printing device as claimed in claim 12, further comprising:

a sending part configured to send guidance information, including information related to the location of the arbitrary printing device and information related to a printing fee, to the user terminal via the network, in response to the e-mail originated from the user terminal.

17. The printing device as claimed in claim 12, wherein said retrieving part retrieves the predetermined electronic file from the file server before or after receiving the print execution instruction originated from the user terminal.

18. A computer-readable storage medium storing a computer program for causing a computer to operate as a printing device, said computer being coupled via a network to a user terminal which requests a printing operation and to a file server which stores electronic files identifiable by corresponding identifiers, said program comprising:

a receiving procedure causing the computer to receive via the network an e-mail having an e-mail address of the computer and originated from the user terminal, said e-mail being a print request containing an identifier of a predetermined electronic file to be printed on the computer;

a retrieving procedure causing the computer to retrieve the predetermined electronic file from the file server itself via the network using the identifier of the predetermined electronic file; and a printing procedure causing the computer to print the predetermined electronic file in response to a print execution instruction originated from the user terminal and received via the network.

19. The computer-readable storage medium as claimed in claim 18, said program further comprising:

a notifying procedure configured to cause the computer to notify the user terminal via the network a fee to print the predetermined electronic file that is retrieved on the computer.

20. The computer-readable storage medium as claimed in claim 18, said program further comprising:

a sending procedure causing the computer to send guidance information, including information related to the location of the arbitrary printing device and information related to a printing fee, to the user terminal via the network, in response to the e-mail originated from the user terminal.

21. The computer-readable storage medium as claimed in claim 18, wherein said retrieving procedure causes the computer to retrieve the predetermined electronic file from the file server before or after receiving the print execution instruction originated from the user terminal.

* * * * *